United States Patent [19]
McAfee et al.

[11] Patent Number: 5,855,313
[45] Date of Patent: Jan. 5, 1999

[54] TWO-STEP BRAZING PROCESS FOR JOINING MATERIALS WITH DIFFERENT COEFFICIENTS OF THERMAL EXPANSION

[75] Inventors: James L. McAfee, Ferguson; Donald A. Deuser, Florissant; John T. Niemann, O'Fallon; Daniel S. Schwartz, U-City, all of Mo.

[73] Assignee: McDonnell Douglas Corporation, St. Louis, Mo.

[21] Appl. No.: 835,257

[22] Filed: Apr. 8, 1997

[51] Int. Cl.$^6$ ........................................................ B23K 1/20
[52] U.S. Cl. .......................................... 228/124.1; 228/254
[58] Field of Search ............................... 228/122.4, 124.1, 228/208, 254; 148/528, 536, 537

[56] References Cited

U.S. PATENT DOCUMENTS 4,958,364  9/1990  Guerin et al. ............................ 378/144
5,161,728  11/1992  Li ......................................... 228/124.1

*Primary Examiner*—Samuel M. Heinrich
*Attorney, Agent, or Firm*—Bryan Cave LLP

[57] ABSTRACT

A two-step process for joining a first part to a second part, the first part having a coefficient of thermal expansion lower than the coefficient of thermal expansion of the second part. An anchor layer is then brazed at a lower temperature to the first part having a high thermal expansion coefficient. The anchor layer has a thickness such that upon cooling it will yield to relieve stress build up resulting from the differing thermal expansion coefficients between it and the first part. The anchor layer is then brazed to the part having a high thermal expansion coefficient. The process is particularly useful for joining carbon-carbon composite parts to copper substrates for use in the manufacture of high temperature heat exchangers as used, for example, in nuclear fusion reactors.

11 Claims, No Drawings

TWO-STEP BRAZING PROCESS FOR JOINING MATERIALS WITH DIFFERENT COEFFICIENTS OF THERMAL EXPANSION

CROSS-REFERENCE TO RELATED APPLICATIONS

This application is a continuation of provisional U.S. application Ser. No. 60/022,351, filed Jul. 24, 1996, now abandoned.

BACKGROUND OF THE INVENTION

In many manufacturing processes it is necessary to join one or more parts made of disparate materials. Brazing is one favored technique for this task. However, because parts made of different materials will usually have different coefficients of thermal expansion (CTE), the two parts will expand by different amounts when subjected to the heat of the brazing operation. Additionally, as the parts cool from the peak brazing temperatures, they will contract by different amounts. This creates strains which can result in damage along the brazed interface between the two, now joined, parts. The higher the brazing temperature, or the greater the difference between the CTE's of the two materials, the more severe these strains become.

This problem may be particularly acute during the manufacture of high temperature heat exchangers. For example, critical components in nuclear fusion reactors are heat shields composed of carbon-carbon composite ("C—C") surfaces joined to water-cooled copper-based substrates. Because of the very high braze temperatures needed to join these materials, the order-of-magnitude difference between the CTE's of the materials causes large strains to form at the joint interface during the cooling process. The strains are frequently large enough to cause failure of the C—C part near the joint. Joints which survive the cooling process contain significant residual strains at room temperature which lead to premature failure of the joint in a thermal fatigue environment.

SUMMARY OF THE INVENTION

It has been found that it is possible to join a first part and a second part, the first part having a CTE lower that the CTE of the second part, using a two-step brazing process designed to minimize differential CTE induced strains retained at the joint interface. For convenience, the first part will be referred to as the "low CTE part" and the second part will be referred to as the "high CTE part" hereafter.

The first step of the process consists of a high temperature brazing cycle that joins a thin metallic anchor layer to the joint surface of the low CTE part. The metallic anchor layer is thin and ductile enough so that, as it contracts more than the low CTE part during cooling from braze temperature, the anchor layer yields (or plastically deforms) to relieve strains that would otherwise accumulate. The high temperature braze material must be capable of wetting the facing surfaces of both the low CTE part and the metallic anchor layer to achieve a structurally and thermally effective joint. The metallic anchor layer must be thin, ductile, and compatible with the high temperature braze material as well as the lower temperature braze materials used in the second step of the process.

The second step of the process is a significantly lower temperature brazing cycle that joins the anchor layer on the low CTE part to the joint surface of the high CTE part. The low temperature braze material must effectively wet the facing surfaces of both the anchor layer on the low CTE part and the high CTE part to achieve a thermally efficient joint. The lowest melting point braze material compatible with the materials and design requirements is selected to minimize the interfacial strains and maintain thermal continuity in the completed joint.

DETAILED DESCRIPTION OF THE INVENTION

As used herein, the term carbon-carbon composites (C—C) shall refer to the class of carbon-based materials that consist of carbon fibers infiltrated with a solid carbon matrix. The term brazing means the joining of two parts by means of melting braze or solder materials between faying surfaces of the parts, the melted material wetting the faying surfaces and solidifying to effectively join the two parts. As used herein, the term braze will be used to include both braze and solder materials in foil, powder, paste, and wire forms.

In describing the invention, many of the process details (e.g. thicknesses, temperatures, etc.) will be described in connection with specific embodiments. One of ordinary skill in the art will recognize that use of other materials may require slightly different processing conditions, which can be easily determined by such a person depending on the specific conditions encountered.

Low CTE parts that are particularly useful when joined to high CTE parts by the method of the present invention include, but are not limited to, carbon-carbon composites (C—C), solid carbon, and graphite materials. Most particularly useful for joining to high CTE parts are C—C parts.

Preferably, the high temperature braze materials used to join the low CTE part to the anchor layer material are commercially available metal braze alloys. The braze material typically has a thickness of one half (50%) of the anchor layer thickness selected. Thicknesses of 0.0005–0.005 inch are preferred with thicknesses of 0.0015–0.0035 inch most preferred. When the low CTE part is made from C—C materials, preferred braze materials include alloys of copper, silicon, silver, and titanium. When joining an anchor layer of copper to C—C composites, preferred braze materials include Cu-ABA™ ($T_{braze}$=1025° C.) or TiCuSil ($T_{braze}$=955° C.), available from Wesgo, Inc.

Anchor layer materials which are useful for joining to the low CTE parts are typically metals. Particularly useful anchor layer metals include, but are not limited to, copper and copper based materials, with C10100 oxygen free electronic grade (OFE) copper most particularly preferred. The anchor layer material must be of a thickness and ductility such that, after being brazed to the low CTE part in the first brazing step, the anchor layer foil will yield and plastically deform to reduce the differential CTE-induced strains that would otherwise result. Thicknesses between 0.001–0.010 inch are preferred with thicknesses of 0.003–0.007 inch particularly preferred.

Low temperature brazing materials useful for joining the anchor layer to the high CTE part are typically metal alloys with significantly lower melting points than the high temperature brazing materials. Preferably, the low temperature brazing materials may be commercially available brazing elements or alloys comprised of aluminum, copper, silicon, and tin. Typical melting points range from about 700° C.-300° C. The lowest melting point material which is compatible with materials and design requirements should be selected to minimize the differential CTE strains induced in the low temperature braze step.

The high CTE parts may comprise any suitable material that has a higher CTE than the low CTE part. Typically, the high CTE parts are made from metals that produce an order of magnitude difference between the CTE's of the high and low CTE parts. Preferably, the high CTE parts that are joined to low CTE parts by the process of this invention comprise copper and copper based materials. Most particularly preferred is C10100 oxygen free electronic grade (OFE) copper.

The method of the present invention will be specifically exemplified, without being limited in any way, by describing the joining a C—C (low CTE) part to a C10100 OFE copper (high CTE) part. The anchor layer comprises a 0.006 inch thick OFE copper foil. The high temperature braze material used is a 0.003 inch thick Cu-ABA™ foil. The low temperature braze material used is a 0.003 inch thick aluminum-silicon braze foil. It will be understood by those skilled in the practice of the art that the process may be used in conjunction with other high and low CTE parts comprised of other materials.

The mating surfaces of the low and high CTE parts, anchor layer material, and high and low braze materials are appropriately cleaned in preparation for brazing operations. For example, the faying surfaces of the low CTE C—C parts may be mechanically abraded with 600 grit abrasive paper and then ultrasonically cleaned in a suitable solvent such as reagent quality ethanol for 15 minutes. The C—C parts are then preferably dried and maintained in vacuum until brazing is ready to proceed. The faying surfaces of the high CTE copper parts, copper anchor layer foil, and braze foils are preferably lightly abraded with 600 grit abrasive paper, solvent cleaned, and stored in a dry atmosphere, such as a vacuum dry box at approximately 180° C. and 0.06 torr, until brazing proceeds.

Preferably, the first step in the two-step process is to join a thin copper anchor layer foil to the C—C part in a high temperature brazing operation. Preferably, a CU-ABA™ braze foil is placed on the faying surface of the C—C part and a C10100 OFE copper foil anchor layer is placed on top of the braze foil. The braze foil and copper anchor layer are preferably aligned and mechanically clamped in intimate contact to the C—C part using, for example, a simple graphite fixture. Preferably, the graphite fixture does not contact the braze foil or braze attachment to the fixture will result.

The fixture containing the C—C part, Cu-ABA™ braze foil, and copper anchor layer assembly is then preferably placed in a furnace and a typical load of 0–5 psi is applied to the exposed surface of the copper anchor layer foil. Typically, a vacuum furnace capable of <10$^{-4}$ torr is used but atmosphere furnaces may also be used. The assembly is then preferably heated into the melting range for Cu-ABA™ braze alloy ($T_{braze}$=approximately 1025° C.) but below that of the copper anchor layer foil. The furnace is preferably ramped to $T_{braze}$ at a rate of less than 50° C. per minute. For this particular system, the temperature is preferably first ramped to approximately 900° C. at a rate of about 10° C./min, held at approximately 900° C. for about 15 minutes, and ramped to $T_{braze}$ at a rate of about 10° C./min. Preferably, the brazing temperature is sustained for 10 minutes to allow complete wetting of the C—C and copper faying surfaces by the braze alloy. The part is then slowly cooled to allow the copper anchor layer to freely yield to minimize the interfacial strains that occur from the differential thermal contraction in the C—C part and copper anchor layer. The brazed subassembly is then preferably stored in vacuum until the second (low temperature) brazing step is ready to proceed.

The second step of the two-step process joins the C—C part/copper anchor layer subassembly to the C10100 OFE copper part in a low temperature brazing process. An aluminum-silicon braze foil, for this system preferably Lucas-Milhaupt Alloy 62–718, is placed on the faying surface of the high CTE copper part. The C—C part/copper anchor layer subassembly is then preferably positioned on top of the braze foil so that the copper anchor layer and the braze foil are in intimate contact. The assembly is preferably aligned and mechanically clamped together in a graphite fixture. The fixture containing the assembly is then placed in a furnace and a load of 3–200 psi is applied to the exposed surface of the C—C part. The furnace may be either a vacuum or an atmosphere furnace. The assembly is then preferably heated into the melting range of the aluminum-silicon braze alloy ($T_{braze}$=approximately 625° C.) at a rate of approximately 10° C. per minute and sustained for approximately 2–4 hours to allow complete wetting of the copper faying surfaces. The brazed assembly is then slowly cooled to room temperature, completing the two-step brazing process.

The method of the present invention is particularly useful in the manufacture of high temperature heat exchangers, which typically consist of a low CTE material (like C—C, or ceramic) attached to a thermally conductive material, such as a metal, with a high CTE. The joint produced by the process of the invention will be thermally conductive, and hence will permit the transfer of heat from the low CTE material to the high CTE material. Such high temperature heat exchangers are useful in a variety of applications, including nuclear fusion reactors, and combustion chambers, leading edges, and actively cooled structures on hypersonic vehicles.

The above disclosure provides the general principles of the present invention and specific details thereof. Persons skilled in the art will readily understand that the invention is not limited thereby, however, and that various alternatives will be apparent to such persons. Accordingly, it is to be understood that changes may be made without departing from the scope of the invention as particularly set forth and claimed.

We claim:

1. A method of joining a first part to a second part, the first part having a thermal expansion coefficient lower than the thermal expansion coefficient of the second part, comprising the following steps:

(a) brazing an anchor layer to the first part, the anchor layer having a thickness such that upon cooling from the brazing operation, it yields to relieve stress which has built up as a result of differences in the thermal expansion coefficients of the anchor layer and the first part; and (b) brazing the second part to the anchor layer.

2. The method of claim 1, wherein the anchor layer has a thickness between about 0.001 and 0.01 inches.

3. The method of claim 2, wherein the anchor layer has a thickness between about 0.003 and 0.007 inches.

4. The method of claim 1, wherein the first part comprises a material selected from the group consisting of carbon-carbon composites and carbon-fiber composites, and ceramics.

5. The method of claim 4, wherein the first part comprises a material selected from the group consisting of carbon-carbon composites and carbon-fiber composites.

6. The method of claim 4, wherein the second part comprises copper.

7. The method of claim 1, wherein the anchor layer comprises a material selected from the group consisting of copper and copper based materials.

8. The method of claim 7, wherein the anchor layer comprises copper.

9. The method of claim 1, wherein the second part comprises a metal or a metal alloy.

10. A method of brazing together a part comprising a carbon-carbon composite material with a part comprising copper, comprising the following steps:

(a) attaching an anchor layer comprising copper to the part comprising a carbon-carbon composite using a high temperature copper-to-carbon-carbon-composite brazing technique, the anchor layer having a thickness between about 0.001 inches and about 0.01 inches; and (b) joining the part comprising copper to the anchor layer using a low temperature, copper-to-copper brazing technique.

11. The method according to claim 10, wherein the anchor layer comprises copper.

* * * * *